US009205741B2

(12) United States Patent
Chabanon

(10) Patent No.: US 9,205,741 B2
(45) Date of Patent: Dec. 8, 2015

(54) MANAGEMENT OF SPEED REGULATION OF A VEHICLE

(75) Inventor: Christian Chabanon, Montigny-le-Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 43 days.

(21) Appl. No.: 14/128,979

(22) PCT Filed: Jun. 13, 2012

(86) PCT No.: PCT/FR2012/051325
§ 371 (c)(1),
(2), (4) Date: Jan. 31, 2014

(87) PCT Pub. No.: WO2012/175845
PCT Pub. Date: Dec. 27, 2012

(65) Prior Publication Data
US 2014/0136073 A1    May 15, 2014

(30) Foreign Application Priority Data

Jun. 24, 2011    (FR) ..................................... 11 55600

(51) Int. Cl.
*B60T 7/12*    (2006.01)
*B60K 31/00*    (2006.01)
*B60W 30/16*    (2012.01)

(52) U.S. Cl.
CPC ............. *B60K 31/00* (2013.01); *B60K 31/0008* (2013.01); *B60W 30/16* (2013.01)

(58) Field of Classification Search
None
See application file for complete search history.

(56) References Cited

U.S. PATENT DOCUMENTS

| 6,353,788 | B1 | 3/2002 | Baker et al. |
| 7,710,249 | B2 * | 5/2010 | Park ............................... 340/438 |
| 8,165,776 | B2 * | 4/2012 | Sugawara et al. ............... 701/96 |
| 2003/0156015 | A1 | 8/2003 | Winner et al. |
| 2005/0256630 | A1 | 11/2005 | Nishira et al. |
| 2007/0102950 | A1 * | 5/2007 | Uematsu et al. ........... 296/96.19 |
| 2009/0088925 | A1 * | 4/2009 | Sugawara et al. ............... 701/41 |
| 2013/0278442 | A1 * | 10/2013 | Rubin et al. .................. 340/905 |
| 2013/0278443 | A1 * | 10/2013 | Rubin et al. .................. 340/905 |
| 2013/0282267 | A1 * | 10/2013 | Rubin et al. .................. 701/301 |

FOREIGN PATENT DOCUMENTS

| DE | 101 18 265 | 10/2002 |
| DE | 103 49 433 | 6/2004 |

(Continued)

OTHER PUBLICATIONS

International Search Report Issued Aug. 2, 2012 in PCT/FR12/051325 Filed Jun. 13, 2012.

(Continued)

*Primary Examiner* — Thomas Tarcza
*Assistant Examiner* — Adam Alharbi
(74) *Attorney, Agent, or Firm* — Oblon, McClelland, Maier & Neustadt, L.L.P.

(57) ABSTRACT

A method of managing speed regulation of a vehicle including at least one regulating system, the method including: receiving a signal originating from a device for tracking white lines, the signal corresponding to an item of information as to overstepping of a marking line on the ground by the vehicle, and managing the regulation as a function of the signal received from the device for tracking white lines.

7 Claims, 2 Drawing Sheets

(56) References Cited

FOREIGN PATENT DOCUMENTS

| EP | 1 170 652 | 1/2002 |
|----|-----------|--------|
| EP | 1 589 233 | 11/2005 |

OTHER PUBLICATIONS

French Search Report Issued Feb. 8, 2012 in FR 1155600 Filed Jun. 24, 2011.

* cited by examiner

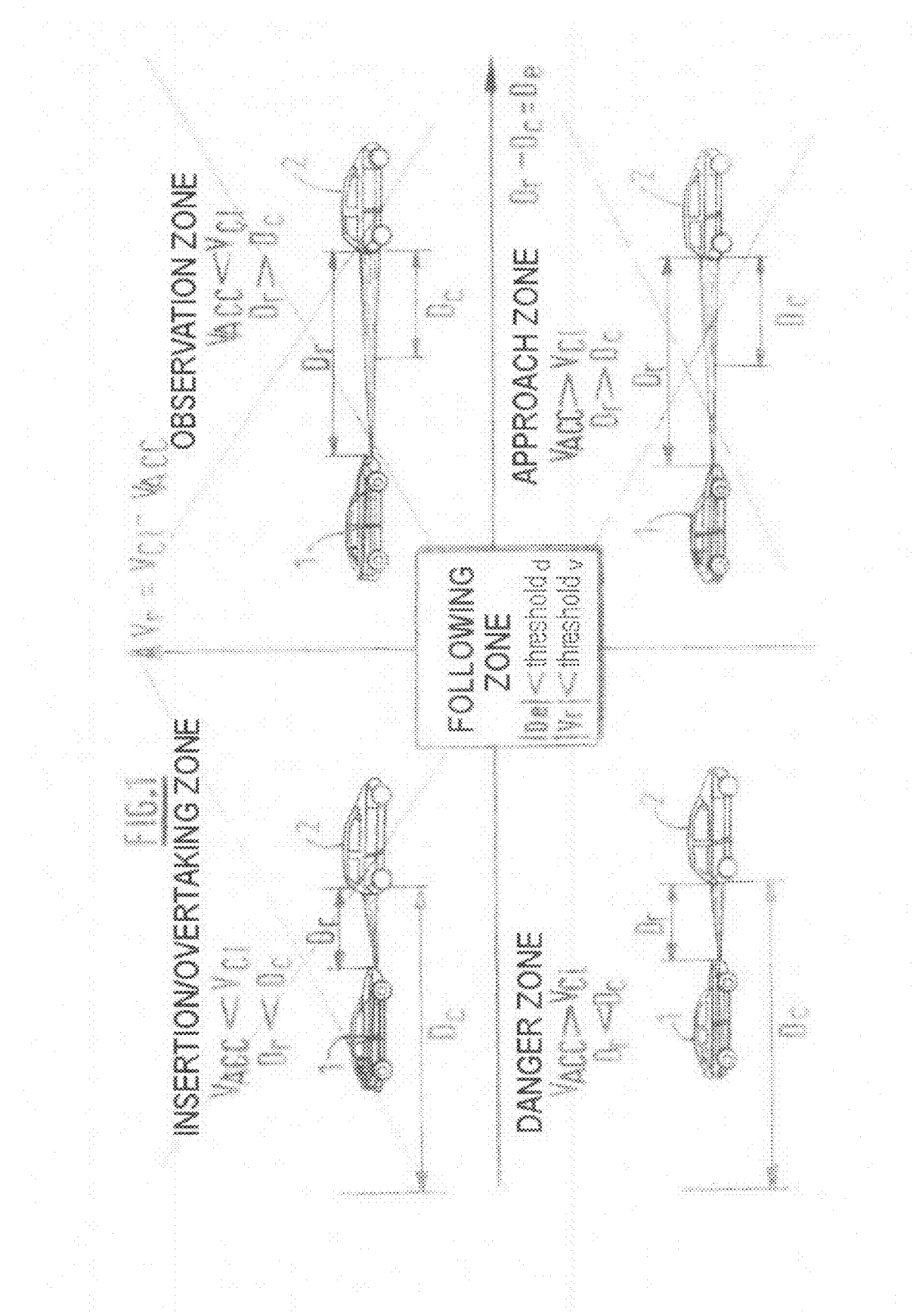

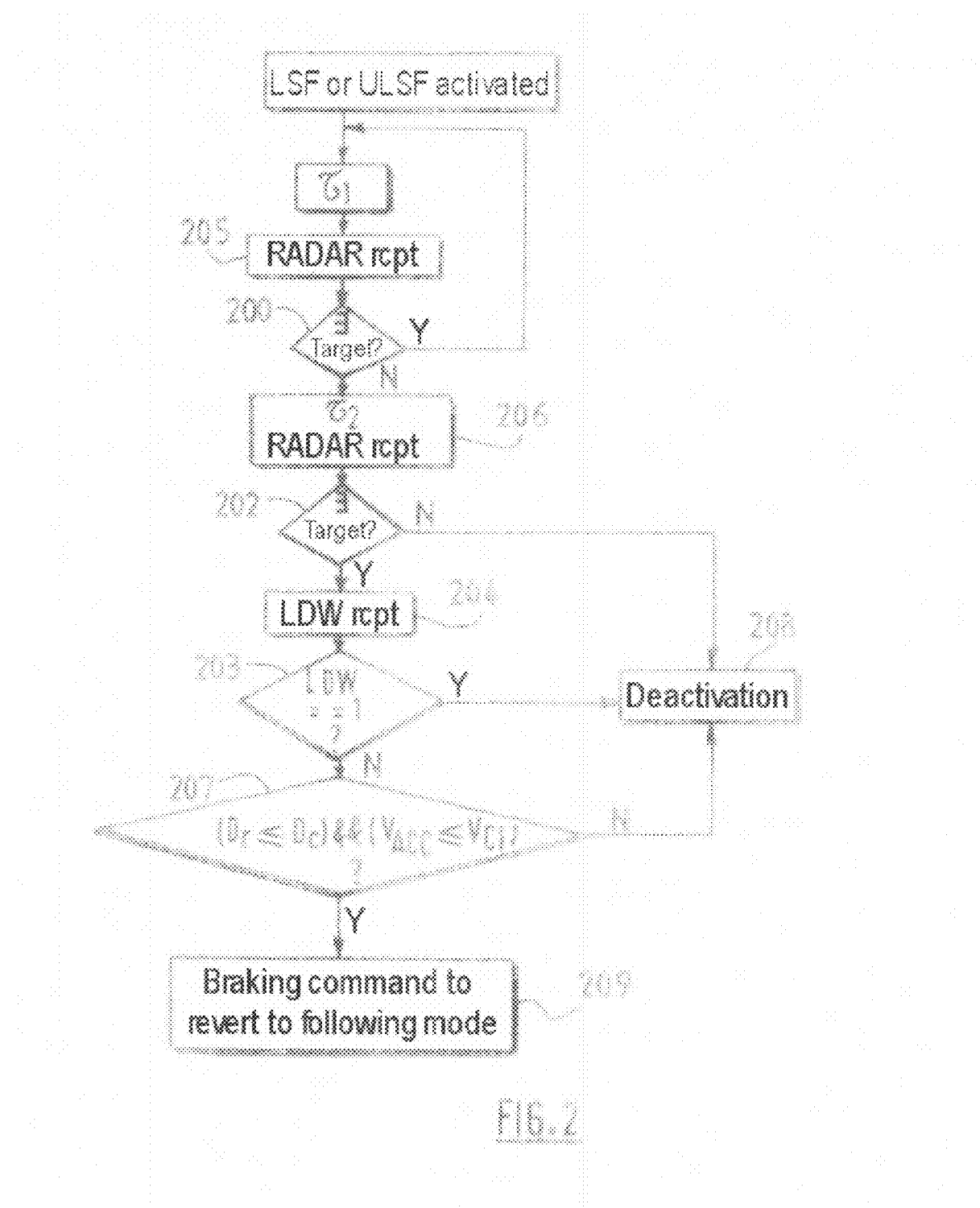

MANAGEMENT OF SPEED REGULATION OF A VEHICLE

BACKGROUND

The invention relates to the management of speed regulation of a vehicle, in particular a motor vehicle.

There are different speed regulation systems with distance controls.

For example, the ACC (adaptive cruise control) system makes it possible to regulate the speed of a motor vehicle as a function of a setpoint speed and as a function of a distance measurement between this vehicle and a target vehicle. This distance measurement is obtained by a rangefinder comprising a sensor, for example a LIDAR (light detection and ranging) sensor, capable of receiving light waves and of measuring a distance between vehicles and a speed of the target vehicle. The ACC system was designed for traffic on fast lanes of highway type.

In a semi-urban environment, the LSF (low speed following) system constitutes a speed regulator with lower speed distance control.

The ULSF (urban low speed following) system can also be cited, which is intended for traffic in town centers. This system enables the driver to delegate the driving in bottlenecks: the vehicle in which the regulation system is installed, called carrier vehicle, is virtually attached to the target vehicle, which can make it possible to render the vehicle flow more fluid.

Various events can disrupt such electronic "trailer" mode driving. In particular, common situations on the road that can be cited include:

the insertion situation, during which a vehicle overtakes the carrier vehicle, and inserts itself on the lane, and the overtaking situation, during which the carrier vehicle overtakes a target vehicle.

In both cases, the regulation system detects a change of target.

The ACC regulation systems are designed to manage these insertion and overtaking situations. Notably, when the driver indicates to overtake, an overtaking aid function can be activated.

On the other hand, the regulation systems designed for the semi-urban or urban environment, like the LSF or ULSF systems, are deactivated if, at a given moment, the rangefinder does not detect any target vehicle, that is to say in most situations of a change of target. It is therefore for the driver to trigger the activation of the regulation function on the new target.

In practice, these LSF, ULSF regulation systems are designed primarily to adapt the speed of the carrier vehicle to that of the target vehicle, in order to increase the fluidity of the vehicle flow. If no target vehicle is detected, it is for the driver to manage the driving in the semi-urban or urban environment.

Furthermore, it can be noted that the regulation systems are thus switched off when the vehicle changes line to overtake the target vehicle. The driver is in a way urged to avoid or limit lane changes. In practice, an absence of movement between the lanes reduces the risks of collisions with motorbikes which travel between the lanes, and can make it possible to substantially increase the flow rate of the traffic by reducing the accordion effect between the vehicles.

On the other hand, when the detection of a change of target is due to an insertion, the frequent reactivation of the regulation system can prove irritating for the driver.

There is therefore a need for a system that is less constraining for the driver, and, generally, there is a need for a regulation better suited to the circumstances.

BRIEF SUMMARY

A method for managing the speed regulation of a vehicle equipped with at least one regulation system is proposed, the method comprising:

a step of reception of a signal from a line departure warning device LDW, this signal corresponding to information concerning the crossing of a marking line on the ground by the vehicle, in which the regulation is managed as a function of the signal received from said line departure warning device.

Thus, the line departure warning device makes it possible to obtain information as to the position of the carrier vehicle in relation to the road lane, and this information can be used to manage the speed regulation.

Such a line departure warning device can make it possible to detect both the continuous lines and the discontinuous lines or the emergency shoulders on a road. These devices, well known to a person skilled in the art, are designed to alert the driver when the vehicle crosses a white line without the driver having previously indicated his or her intention to cross this line by means of an indicator. In this case, a vibrator function is activated in order to make the steering wheel vibrate so as to give the driver the sensation of crossing the emergency shoulder line, and thus wake him or her up, or at least attract his or her attention.

Advantageously, and in a nonlimiting manner, the method may comprise a step of detection of a change of target vehicle. Thus, the LDW device is used to differentiate the insertion situations from the overtaking situations.

This device can thus be exploited to distinguish the overtaking situations from the insertion situations, and thus make the regulation more fluid.

Advantageously, and in a nonlimiting manner, the method may comprise a step of controlling the regulation system as a function of the signal received from the line departure warning device. For example, such or such a regulation system is activated and/or deactivated as a function of the signal received from the LDW device.

Alternatively, provision can be made for the signals received from the LDW device to be used for an intra-system regulation management. For example, the transition from one state to another in a given regulation system can be a function of the signal received from the LDW device.

Advantageously, and in a nonlimiting manner, during the control step, the activation/deactivation of the regulation system is controlled as a function of the signal received from the line departure warning device. The control step may notably consist in deactivating the regulation system and/or in preventing a deactivation of the regulation system depending on the situation detected.

Thus, the regulation system may remain activated despite the detection of a change of target.

Advantageously, and in a nonlimiting manner, the control step may consist in deactivating the regulation system when the signal received from the line departure warning device indicates a crossing of a white line. In other words, a deactivation of the regulation system is maintained in the overtaking situations, in order to urge the driver to remain in the line.

Also advantageously and in a nonlimiting manner, when the signal received from the line departure warning device indicates a non-crossing of the white line, the regulation system may remain activated despite the detection of the change of target. In other words, the regulation system is maintained in the insertion situations.

Advantageously, the vehicle may be equipped with an LSF and/or ULSF regulation system.

One and/or the other of these systems can be switched off in case of the detection of a change of target and of detection of the crossing of a white line.

Thus, this method in a way makes it possible to accept an insertion of a new target vehicle without disconnecting the regulation. The vehicle remains in LSF or ULSF mode and will adapt its speed to revert to the desired following distance.

A computer program is also proposed, comprising instructions for executing the method described above when these instructions are executed by processing means of processor type.

A device for managing the speed regulation of a vehicle equipped with at least one regulation system is also proposed, comprising means for receiving a signal from a line departure warning device, this signal corresponding to information concerning the crossing of a marking line on the ground by the vehicle, and processing means arranged to manage the regulation as a function of this received signal.

This device may comprise or be incorporated in a processor, for example a microcontroller, a microprocessor, a DSP (digital signal processor), an ASIC (application-specific integrated circuit), an FPGA (field programmable gate array), or similar.

This device can be arranged in such a way as to implement the method described above.

BRIEF DESCRIPTION OF THE DRAWINGS

The invention will be described in more detail with reference to:

FIG. 1, which illustrates the states of an LSF speed regulation system, the states of an ACC system not managed by the LSF systems being shown crossed through, FIG. 2, which is the algorithm of an exemplary method according to one embodiment of the invention.

DETAILED DESCRIPTION

Referring to FIG. 1, a vehicle 1 is equipped with one or more regulation systems that are not represented, with one or more rangefinder(s), one or more speed sensor(s), one or more electronic computer(s) to estimate relative distances and relative speeds, a user interface, a regulation module, etc.

The relative distance $D_e$ is defined as the difference between the distance $D_r$ between the vehicles 1, 2 and a setpoint distance $D_C$. The setpoint distance is itself a function of the speed. The relative speed $V_r$ is defined as the difference between the speed $V_{CI}$ of a target vehicle 2 and the speed $V_{ACC}$ of the vehicle 1 in which the ACC system is implemented.

In an ACC system as described in the document FR 2 770 016, the distance control between two vehicles is based on the description of a plan with five states:

observation, when the relative distance $D_e$ is positive, and the relative speed $V_r$ is positive,
approach, when the distance $D_e$ is positive and the relative speed $V_r$ negative,
insertion or overtaking when the relative distance $D_e$ is negative and the relative speed $V_r$ positive,
danger when the relative distance $D_e$ and the relative speed $V_r$ are negative, and
following when the relative distance $D_e$ and the relative speed $V_r$ are below two respective speed and distance thresholds.

When the vehicle 1 is in the following zone, the speed of the vehicle 1 is relatively close to the speed of the vehicle 2, and the distance between the vehicles 1, 2 is relatively close to the setpoint distance $D_C$.

The LSF systems are described in the standard ISO 22178 and make it possible to complement this first driving aid ACC by allowing the 70 km/h regulation for example until the vehicle stops. The LSF systems also allow for braking mode decelerations to a target of up to 5 meters per second squared. These LSF systems are designed for semi-urban traffic.

In order to increase safety, the number of states of an LSF system is reduced compared to the ACC system to simply three of the five states of FIG. 1: approach, following and danger.

For relatively low speeds, the product of the following time with the speed of the vehicle is further reduced. For a time of two seconds and a speed of 30 km/h, the setpoint distance is approximately 17 meters. The driver therefore has to be particularly vigilant in order to be able to retake control of his or her vehicle in the event of an incident.

The vigilant driver wanting to continue with a speed regulation service will be able to do so by actuating the ULSF mode below a minimum speed threshold. The driver must be relatively attentive, because the distances between vehicles are particularly low for low speeds. Also, the activation on the vehicles in following mode only is preferable. The ULSF systems are thus designed with only two of the five states of FIG. 1: following and danger.

The vehicle indicates to the driver if the ULSF activation is possible. The driver can then activate the ULSF system and regulate his or her speed to the speed of the target vehicle until this target vehicle stops. This form of regulation is aborted if following mode is exited.

The driver is thus obliged to choose whether the situation allows him or her to regulate his or her speed to that of the vehicle in front. In relatively complex situation cases, with regular insertions of motorbikes or other vehicles, the driver may have to repeat the activation of the ULSF system frequently. The driver may thus be urged to avoid lane changes in his or her own vehicle if he or she wants to minimize the activations. It is also known that this absence of movement between the lanes can reduce the accordion effect between the vehicles.

The vehicle 1 is also equipped with a regulation management device which is not represented, for example a processor, suitable for deactivating and activating these ACC, LSF, ULSF regulation systems.

FIG. 2 is a flow diagram illustrating an exemplary method implemented by this device.

This device includes reception means, of the input port type for example, for receiving signals from the rangefinder and signals from the line departure warning device.

The device regularly receives RADAR signals from the rangefinder, in steps 205, and checks, in tests 200, for the presence of the target vehicle to which the carrier vehicle is virtually attached by the LSF or ULSF regulation system.

The rangefinder may, for example, comprise a radar and/or a camera.

If, at a given moment, no target vehicle is detected, a waiting step 206 for a time $T_2$ is executed then new RADAR signals are received from the rangefinder.

A new test 202 concerning the presence of a target vehicle is then performed, and if no vehicle is detected, the regulation system is deactivated in a step 208. In practice, in a semi-urban or urban environment, it is considered that the lane is free in front of the carrier vehicle and that it is for the driver to manage the unforeseen driving situations.

This waiting time $T_2$ is longer than the waiting time practiced in the prior art before deactivating the regulation system, in order to clearly distinguish the target change situations from the situations in which the carrier vehicle is effectively ahead of a line of vehicles or alone on the road.

If the test 202 is positive, a target change situation is considered to apply.

An LDW signal is received from a line departure warning device in a step 204.

A test 203 is performed concerning the value of this LDW signal. If this test reveals a crossing of a lane by the carrier vehicle, the regulation system is deactivated. The test 203 thus makes it possible to detect an overtaking situation.

If the test 203 does not reveal any lane crossing, there is no immediate deactivation of the regulation system, because it is considered that an insertion situation applies.

The regulation system is thus controlled as a function of the value of the LDW signal received from the line departure warning device.

In case of an insertion situation, a test 207 is performed. If the speed and distance values correspond to an insertion or following state, the regulation system acts on the brakes to keep the real distance close to the setpoint distance, and the speed of the carrier vehicle close to the speed of the target. In other words, the system seeks to revert to a following state.

If the test 207 is negative, and the speed and distance values correspond to an approach or observation state, the regulation system is switched off in order to force the driver to retake control.

If the test 207 is negative and the speed and distance values correspond to a danger state, it is possible to provide a braking step which is not represented and/or an alarm step which is not represented. For example, in case of the detection of a danger situation, braking is also applied and an audible and/or haptic and/or visual indication indicates and prompts the driver to retake control of the braking because the deceleration conditions of the system are exceeded.

The driver can thus apply a stronger braking than the upper limit of the LSF, ULSF systems, so it is thus preferable to require the driver to handle the driving.

This method can thus make it possible to accept a new target vehicle without disconnecting the regulation. The carrier vehicle remains in LSF or ULSF mode and will brake automatically to revert to the following distance desired by the driver.

It is known that the ULSF mode can remain activated from following to stopping. Also, provision is made in the embodiment described for, in case of stopping, the driver to have to activate the ULSF system on restarting, even if a new target vehicle inserts itself into the lane during the stoppage. An automatic activation—unexpected for the driver—of the ULSF system is thus avoided.

The invention claimed is:

1. A method for managing speed regulation of a carrier vehicle including at least one regulation system, the method comprising:
   maintaining, by the regulation system, the vehicle at a predetermined speed or a predetermined distance behind a first target vehicle positioned ahead of the carrier vehicle in a lane;
   detecting a change from the first target vehicle to a second target vehicle positioned ahead of the carrier vehicle;
   receiving a signal from a line departure warning device, the signal corresponding to information concerning a crossing of a marking line on the ground by the carrier vehicle; and
   managing the speed regulation as a function of the signal received from the line departure warning device, the managing including
      deactivating the regulation system when the signal received from the line departure warning device indicates that the carrier vehicle crossed the line; and
      comparing, via the regulation system, relative speed and distance values between the second target vehicle and the carrier vehicle when the signal received from the line departure warning device indicates that the second target vehicle is inserted in the lane between the carrier vehicle and the first target vehicle.

2. The method as claimed in claim 1,
   wherein the managing includes, after the comparing, deactivating the regulation system if the comparing shows that the relative speed and distance values correspond to a state of danger, of approach, or of observation.

3. The method as claimed in claim 2, further comprising a braking and/or an alarming if the comparing shows that the relative speed and distance values correspond to a state of danger.

4. The method as claimed in claim 1, in which the at least one regulation system comprises an LSF system and/or a ULSF system.

5. A non-transitory readable medium including a computer program product including instructions for implementing the method as claimed in claim 1 when executed by a processor.

6. A device for managing speed regulation of a carrier vehicle including at least one regulation system that maintains the vehicle at a predetermined speed or a predetermined distance behind a first target vehicle positioned ahead of the carrier vehicle in a lane, comprising:
   means for receiving a signal from a rangefinder, the signal indicating a change from the first target vehicle to a second target vehicle positioned ahead of the carrier vehicle;
   means for receiving a signal from a line departure warning device, the signal corresponding to information concerning crossing of a marking line on the ground by the carrier vehicle; and
   processing means arranged to manage the speed regulation as a function of the received signal, the processing means being configured to
      deactivate the regulation system when the signal received from the line departure warning device indicates that the carrier vehicle crossed the line; and
      comparing, via the regulation system, relative speed and distance values between the second target vehicle and the carrier vehicle when the signal received from the line departure warning device indicates that the second target vehicle is inserted in the lane between the carrier vehicle and the first target vehicle.

7. The method as claimed in claim 1, wherein the comparing relative speed and distance values between the second target vehicle and the carrier vehicle includes comparing a distance between the second target vehicle and the carrier vehicle with a setpoint distance and comparing, via the regulation system, a speed of the carrier vehicle with a speed of the second target vehicle.

* * * * *